US009563424B2

United States Patent
Sehr et al.

(10) Patent No.: US 9,563,424 B2
(45) Date of Patent: Feb. 7, 2017

(54) NATIVE CODE INSTRUCTION SELECTION

(71) Applicant: GOOGLE INC., Mountain View, CA (US)

(72) Inventors: David C. Sehr, Cupertino, CA (US); Bennet S. Yee, Mountain View, CA (US); Jean-Francois Bastien, Mountain View, CA (US)

(73) Assignee: Google Inc., Mountain View, CA (US)

( * ) Notice: Subject to any disclaimer, the term of this patent is extended or adjusted under 35 U.S.C. 154(b) by 805 days.

(21) Appl. No.: 13/756,371

(22) Filed: Jan. 31, 2013

(65) Prior Publication Data

US 2014/0052971 A1 Feb. 20, 2014

Related U.S. Application Data

(60) Provisional application No. 61/684,396, filed on Aug. 17, 2012.

(51) Int. Cl.
G06F 9/30 (2006.01)
G06F 9/45 (2006.01)

(52) U.S. Cl.
CPC .......... *G06F 9/30003* (2013.01); *G06F 8/52* (2013.01)

(58) Field of Classification Search
CPC .................................... G06F 9/3017
USPC ......................................... 712/226
See application file for complete search history.

(56) References Cited

U.S. PATENT DOCUMENTS

| 4,439,828 A * | 3/1984 | Martin ................. G06F 9/3017 712/226 |
| 6,928,536 B2 * | 8/2005 | Duesterwald ............ G06F 8/66 712/226 |
| 8,402,541 B2 | 3/2013 | Craioveanu et al. |
| 2005/0216712 A1 * | 9/2005 | Butcher ................ G06F 9/4426 712/234 |

(Continued)

FOREIGN PATENT DOCUMENTS

| EP | 1820099 | 8/2007 |
| EP | 2174252 | 4/2010 |
| WO | WO2012084507 | 6/2012 |

OTHER PUBLICATIONS

Hennessy & Patterson, "Computer Architecture, A Quantitative Approach". Morgan Kaufmann Publishers, 2007. 4 pages.*

(Continued)

*Primary Examiner* — Andrew Caldwell
*Assistant Examiner* — Michael Metzger
(74) *Attorney, Agent, or Firm* — Fish & Richardson P.C.

(57) ABSTRACT

Methods, systems, and apparatus, including computer programs encoded on computer storage media, for selecting native code instructions. One of the methods includes receiving an initial machine language instruction for execution by a processor in a first execution mode; determining that a portion of the initial machine language instruction, when executed by the processor in a second execution mode, satisfies one or more risk criteria; generating one or more alternative machine language instructions to replace the initial machine language instruction for execution by the processor in the first execution mode, wherein the one or more alternative machine language instructions, when executed by the processor in the second execution mode, mitigate the one or more risk criteria; and providing the one or more alternative machine language instructions.

27 Claims, 3 Drawing Sheets

(56) References Cited

U.S. PATENT DOCUMENTS

| | | | | |
|---|---|---|---|---|
| 2009/0077356 A1* | 3/2009 | Fulton | ................... | G06F 9/445 |
| | | | | 712/226 |
| 2009/0158015 A1* | 6/2009 | Hillman | .............. | G06F 9/30174 |
| | | | | 712/226 |
| 2009/0222925 A1* | 9/2009 | Hilaiel | ................... | G06F 21/53 |
| | | | | 726/25 |
| 2010/0122271 A1* | 5/2010 | Labour | ............... | G06F 9/44526 |
| | | | | 719/328 |
| 2012/0144165 A1* | 6/2012 | Bybell | ............... | G06F 9/30181 |
| | | | | 712/208 |
| 2012/0222116 A1 | 8/2012 | Chenette | | |
| 2013/0086688 A1 | 4/2013 | Patel et al. | | |

OTHER PUBLICATIONS

International Search Report and Written Opinion in International Application No. PCT/US2013/052869, dated Oct. 21, 2013, 12 pages.

Zhang et al.: "Pollux VMM: A Virtual Machine Monitor for Executing Untrusted Code", 1st International Conference on Information Science and Engineering (ICISE 2009), IEEE, Dec. 26, 2009, 1785-1788.

Lee et al.: "Inline Emulation for Paravirtualization Environment on Embedded Systems", 17th IEEE International Conference on Embedded and Real-Time Computing Systems and Applications (RTCSA), IEEE, Aug. 28, 2011, 388-392.

International Preliminary Report on Patentability in International Application No. PCT/US2013/052869, dated Feb. 26, 2015, 8 pages.

\* cited by examiner

NATIVE CODE INSTRUCTION SELECTION

BACKGROUND

This specification relates to executing native code modules.

A user of a computing device, e.g., a personal computer, a mobile phone, or a personal digital assistant, may install and execute an application downloaded from a web site or received from a friend as an email attachment. However, installing and executing such applications on a given computing device typically involves a level of trust that is granted on an all-or-nothing basis by the operating system of the computing device. Furthermore, bugs in the operating system may inadvertently allow applications to access resources As a result, some applications, e.g., native applications, may have full access to the operating system and/or resources of the computing device, while other applications, e.g., web applications, may have little to no direct access to the operating system and/or resources of the computing device.

Such coarse application of trust may negatively impact the execution of all applications on the computing device. For example, native applications may produce unwanted side effects by modifying files on the computing device and/or engaging in computation or communication outside of the tasks or features requested by the user. On the other hand, web applications may execute one to two orders of magnitude slower than native applications and may provide limited functionality to the user.

SUMMARY

Some computer processors can operate in multiple execution modes, where each mode corresponds to a different instruction set architecture. An execution environment for running native code modules may be vulnerable to a "mode switching" attack if a malicious thread jumps into the native code module while also switching the execution mode of the processor. This kind of mode switch can expose the execution environment to further harm by having a processor execute instructions in a second execution mode when the instructions were initially selected and validated for a first execution mode. These instructions might be harmful when executed in the second execution mode and may be disguised as instructions for the first execution mode.

Thus, according to one aspect of the subject matter described in this specification, a system can mitigate the potential harm resulting from mode switching attacks by selecting machine language instructions for a native code module to make it likely that the machine language instructions, if executed by the processor in a second execution mode, will not perform unsafe or unauthorized operations.

In general, one innovative aspect of the subject matter described in this specification can be embodied in methods that include the actions of receiving an initial machine language instruction for execution by a processor in a first execution mode; determining that a portion of the initial machine language instruction, when executed by the processor in a second execution mode, satisfies one or more risk criteria; generating one or more alternative machine language instructions to replace the initial machine language instruction for execution by the processor in the first execution mode, wherein the one or more alternative machine language instructions, when executed by the processor in the second execution mode, mitigate the one or more risk criteria; and providing the one or more alternative machine language instructions. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include receiving an intermediate language instruction, wherein generating the one or more alternative machine language instructions comprises selecting the one or more alternative machine language instructions to correspond to the intermediate language instruction. Determining that the portion of the initial machine language instruction satisfies the one or more risk criteria comprises determining that the portion of the machine language instruction when executed by the processor in the second execution mode comprises a branch instruction. The initial machine language instruction in the first execution mode is a NOP instruction, and wherein generating the one or more alternative instructions comprises altering the NOP instruction in the first execution mode. The initial machine language instruction in the first execution mode is a NOP instruction, and wherein generating the one or more alternative machine language instructions comprises generating a sequence of instructions that are equivalent to a NOP instruction in first execution mode. The sequence of instructions comprises one or more AND instructions. Generating the one or more alternative machine language instructions comprises selecting an instruction that halts execution in the second execution mode. Selecting an instruction that halts execution in the second execution mode comprises selecting a breakpoint instruction in the second execution mode. Selecting an instruction that halts execution in the second execution mode comprises selecting an instruction that writes to an address in non-writeable memory, or an instruction that reads from an address in non-readable memory. Generating the one or more alternative machine language instructions comprises altering a destination address of a branch instruction in second execution mode. Altering the destination address of a branching instruction in the second execution mode comprises masking the least-significant bits of the destination address.

Particular embodiments of the subject matter described in this specification can be implemented so as to realize one or more of the following advantages. Carefully selecting machine language instructions can mitigate the potential harm resulting from mode switching attacks and can make native code execution environments safer and less prone to malicious code.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
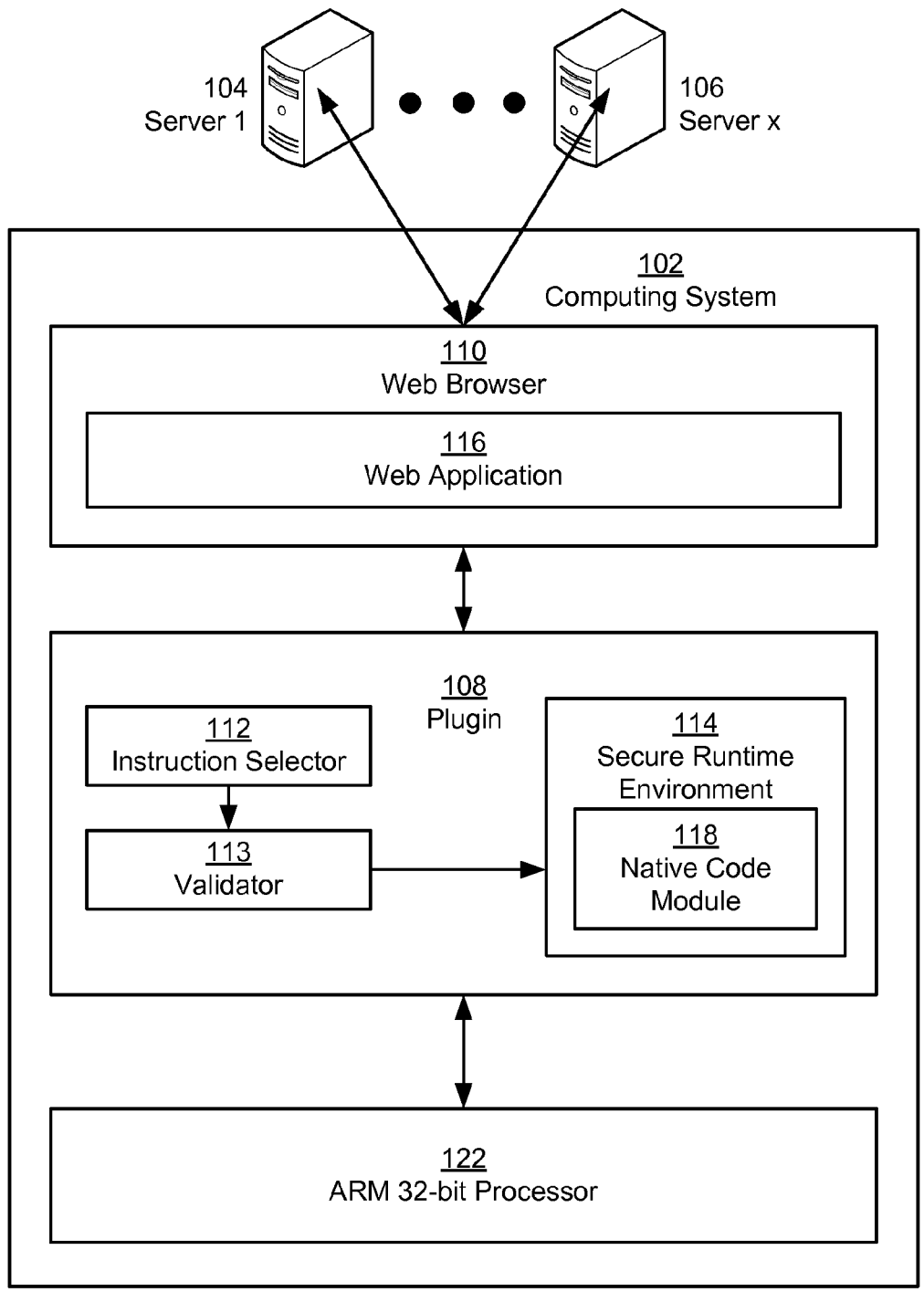
FIG. 1 is a diagram of an example system.

FIG. 1 is a diagram of an example system. This system includes a computing system 102 and a set of servers, e.g., server 1 104 and server x 106. Computing system 102 includes a web application 116 running within a web browser 110, a plugin 108, and an ARM 32-bit processor 122. Each of these components is described in further detail below.

Computing system 102 is an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system that coordinates the use of hardware and software resources on computing system 102, as well as one or more applications, e.g., a web browser 110 or a web application 116, that perform specialized tasks for the user. For example, computing system 102 may include applications such as an email client, address book, document editor, web browser 110, and/or media player. To perform tasks for the user, applications may obtain the use of hardware resources, e.g., ARM 32-bit processor 122, memory, I/O components, network interface card, graphics-processing unit (GPU), and so on, on computing system 102 from the operating system, as well as interact with the user through a hardware and/or software framework provided by the operating system, as described below.

In some cases, computing system 102 includes functionality to obtain and/or execute applications using a network connection. In particular, computing system 102 may obtain web application 116 from one or more servers, e.g., server 1 104 or server x 106, using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the operating system, drivers, or hardware associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Oracle Corporation). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may execute a the native code module 118 within plugin 108. Like web application 116, the native code module 118 may be obtained from one or more servers, e.g., server 1 104 or server x 106, by web browser 110. For example, web application 116 may provide a hyperlink to the native code module 118 on the Internet. Web browser 110 may then download the native code module 118 from the Uniform Resource Locator (URL) specified in the hyperlink. Alternatively, the native code module 118 may be specified by the user or by an external source, such as another web application and/or a native application. Furthermore, the native code module 118 may be obtained from local storage, e.g., a browser cache, on computing system 102 instead of from a server.

Alternatively, code in an intermediate language, e.g., LLVM bitcode, can be obtained from one or more servers, e.g., server 1 104 or server x 106, which can then be compiled by a compiler on computing system 102 into native code, e.g. the native code module 118, suitable for direct execution on a processor of computing system 102.

More specifically, the native code module 118 is a software module containing native code that runs directly on the ARM 32-bit processor 122. As a result, the native code module 118 may be used to perform tasks that require substantial access to CPU resources on computing system 102. For example, the native code module 118 may be used by web application 116 to provide computationally intensive features associated with physics simulation, signal processing, artificial intelligence, modeling, flexible high-throughput cryptography, and/or multimedia editing and analysis.

Plugin 108 includes a variety of mechanisms to protect the system against various kinds of unsafe execution of the native code module 118. In particular, instructions to be included in the native code module 118 are selected by instruction selector 111. The instruction selector 111 selects which machine language instructions to include in the native code module 118. The instruction selector 112 can receive instructions from a compiler in an intermediate language and can select a corresponding set of native code machine language instructions to be included in the native code module 118. The instruction selector 111 can also be implemented as part of a compiler or a binary translator. Alternatively, the instruction selector 111 can receive fully-compiled machine language instructions and then modify the machine language instructions in certain ways to increase the likelihood of safe execution of the native code module 118, as will be described in further detail below.

The selected instructions are then validated by a validator 112 prior to execution. Native code module validation is described in U.S. patent application Ser. No. 12/117,634, now U.S. Pat. No. 9,058,483, filed 8 May 2008, which is incorporated herein by reference. Before the native code module 118 is validated, the native code module 118 is loaded into a secure runtime environment 114 provided by plugin 108. Optionally, some or all of the validation may be performed before the native code module 118 is loaded into secure runtime environment 114. Native code execution in a secure runtime environment is described in U.S. patent application Ser. No. 12/117,650, now U.S. Pat. No. 8,424,082, filed 8 May 2008, which is incorporated herein by reference. Secure runtime environment 114 may also be provided by a web browser extension to web browser 110, or secure runtime environment 114 may be built into web browser 110. The secure runtime environment can also be provided as a standalone application program installed on the computing system 102.

Once the native code module 118 is validated, the native code module 118 is executed in secure runtime environment 114. As described in the above-referenced patent applications, secure runtime environment 114 may load and launch the native code module 118 from memory; provide an execution environment that includes communications, threads, memory management, and debugging support for the native code module 118; moderate access to system resources according to an access policy for the native code module 118; and/or support the isolated execution of multiple native code modules on computing system 102. Consequently, secure runtime environment 114 may provide additional mechanisms for ensuring the secure execution of the native code module 118 on computing system 102. In particular, secure runtime environment 114 may restrict access from the native code module 118 to registers, memory, and/or other resources associated with the ARM 32-bit ISA.

Because the native code module 118 includes code that runs directly on hardware, the native code module 118 may be platform-independent with respect to the operating system, web browser 110, and/or other software components on computing system 102. As described in the above-referenced patents, plugin 108 and/or the native code module 118 may also include mechanisms for executing on a variety of instruction set architectures, including the use of "fat binaries" and binary translators.

In some cases, the system of FIG. 1 includes functionality to safely execute the native code module 118 within an ARM 32-bit instruction set architecture (ISA). In other words, plugin 108 and web browser 110 may correspond to software modules that execute directly on ARM 32-bit processor 122 using the ARM 32-bit ISA. Moreover, the native code module 118 may correspond to a set of ARM 32-bit instructions and data that is loaded into the address space of ARM processor 122 and used to facilitate the execution of web application 116.

Plugin 108 also includes a variety of mechanisms to mitigate harm from potential "mode switching attacks" that could compromise the safe execution of code in the native code module 118. Some modern processors can operate in multiple execution modes, with each execution mode corresponding to a distinct instruction set. For example, an ARM 32-bit processor can execute code in a first execution mode in which executable instructions are treated as 32-bit instructions of a 32-bit ARM ISA. The same processor can also execute code in a second execution mode in which executable instructions are treated as 16-bit or 32-bit instructions of a 16-bit Thumb ISA or a 32-bit Thumb ISA. Such a second execution mode that operates on smaller instructions can be useful for reducing the memory requirements for a particular code module.

However, a potential system vulnerability exists if a processor executes instructions intended for a first execution mode while operating in a second execution mode intended for a different instruction set within the same architecture. This could occur, for example, by an execution thread exploiting a first system vulnerability, a so-called "stepping stone," to jump to an arbitrary code location within validated native code while also switching the execution mode of the processor to an unintended execution mode. For example, an ARM processor implements a "branch-and-exchange" instruction in which execution jumps to a specified address, which may also change the execution mode from a first execution mode (for ARM) to a second execution mode (for Thumb). As another example, a stepping stone vulnerability may be used to switch the "endianness" mode of a processor. In other words, switching the endianness, e.g., from "big endian" to "little endian," of a processor will cause a processor to fetch instruction bits in a different order, which will result in the instructions performing a different operation when executed.

A malicious thread may find and exploit a stepping stone vulnerability to jump to an arbitrary location within the native code module 118 with a branch-and-exchange instruction, while also setting a bit that will switch the execution mode of the processor. Because the code in the native code module 118 has been validated only for the intended instruction set of the first execution mode, the processor could then begin executing unvalidated Thumb code while in the second execution mode, which could further amplify the scope of the attack. For example, an attacker could disguise malicious Thumb code as ARM code in the native code module 118.

The first, stepping stone, vulnerability may be located within code of another thread or another application on the computing system 102. For example, the vulnerability may be located within code of web browser 110 executing on the computing system 102. An attacker may for example determine a way to compromise the address of a branch instruction, which can transform the branch instruction into a branch-and-exchange instruction. The altered branch-and-exchange instruction may then be used to jump to and execute unvalidated Thumb code which had been disguised as validated ARM code located in the native code module 118.

Such mode switching attacks can be detected by analyzing crash reports that show program crashes when executing in an unexpected execution mode. Similarly, crash reports may show that a program halted on an ARM instruction that is not a halting instruction, but that is a halt instruction in Thumb.

Additionally, the instruction selector 111 can take various active steps to mitigate the possibility that the selected and validated instructions of the native code module 118 will be used to do something harmful as part of a mode switching attack.

To further mitigate the possibility of harm during a mode switching attack, the validator 112 can also validate code in the native code module 118 for each of multiple instruction sets. For example, the validator 112 could mitigate the risk of a mode switching attack by validating the code for both ARM and Thumb instruction sets. However, in some cases doing so may be too restrictive or may be impossible.

Figure 2:
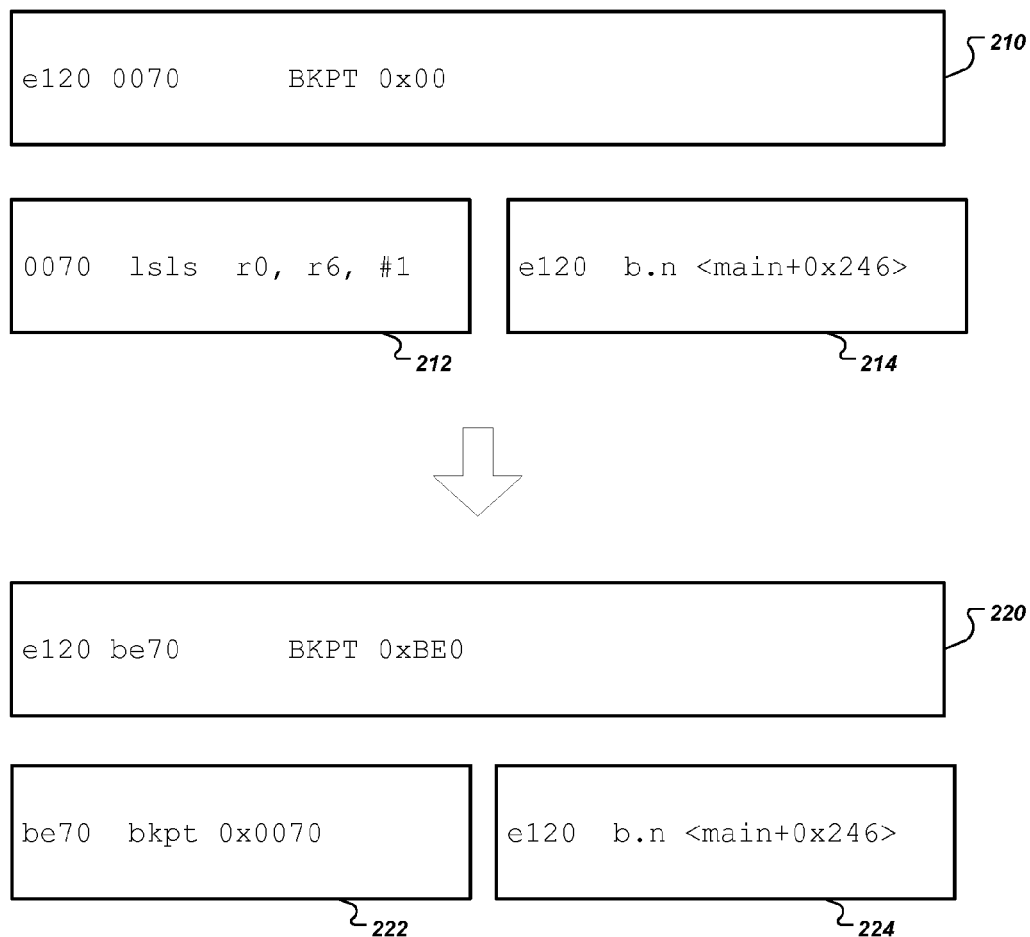
FIG. 2 shows example code blocks.

FIG. 2 shows example code blocks. In particular, FIG. 2 shows how ARM four octets can be interpreted as a single 32-bit ARM instruction or interpreted as two 16-bit Thumb instructions, depending on the execution mode of the processor.

For example, instruction 210 illustrates an ARM breakpoint instruction, "MUT," which takes an optional immediate value. If the immediate value is zero, this instruction would be interpreted in Thumb as a left shift instruction 212 and as a branch instruction 214. This code sequence is potentially exploitable with a mode switching attack, as the branch instruction 214 could be used to jump to an arbitrary code section.

To mitigate the risk of this type of mode switching attack, the system can select an alternative ARM breakpoint instruction 220. The system has altered the initial instruction 210 to change the optional immediate value to 0×BE0 rather than 0. In doing so, the alternative instruction 220, when interpreted as two Thumb instructions 222 and 224, results in two instructions that have a mitigated risk of exploitation. By altering the value of the immediate, Thumb instruction 222 is now interpreted as a Thumb breakpoint, which halts execution of a malicious thread executing in an unintended execution mode.

Thus, the system has cheaply mitigated the risk of a mode switching attack by choosing an equivalent ARM breakpoint instruction whose interpretation as two Thumb instructions would be less likely to be harmful.

Figure 3:
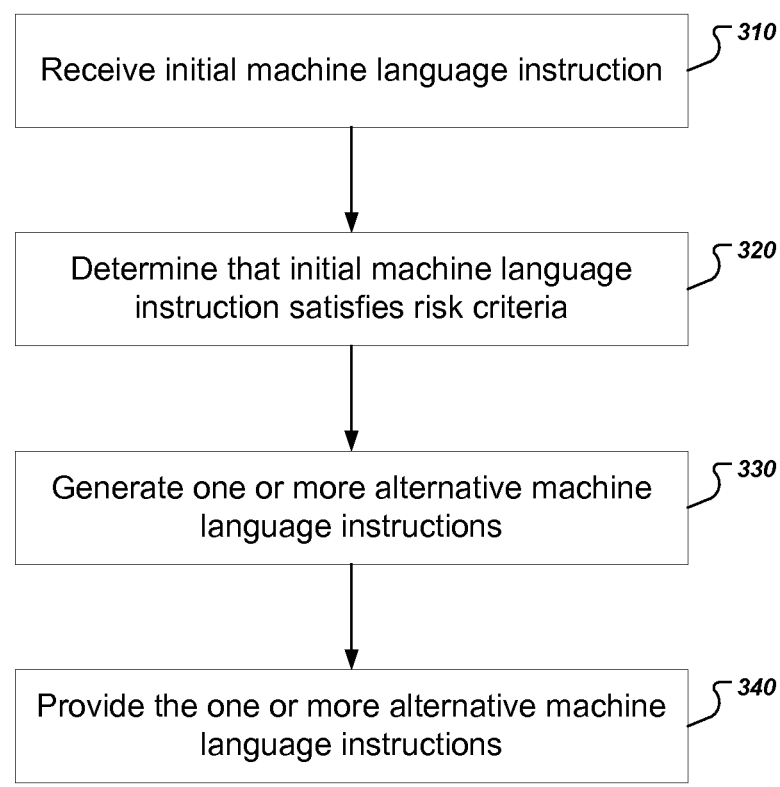
FIG. 3 is a flow chart of an example process for selecting instructions.

FIG. 3 is a flow chart of an example process 300 for selecting instructions. The process 300 analyzes ARM instructions for potential vulnerabilities when treated as Thumb instructions in a second execution mode. The process 300 can be performed, for example, by an instruction selector, e.g., instruction selector 111, or by some other module that generates or modifies computer-executable code. For example, a compiler, binary translator, or a validator, e.g., validator 113, could also perform the process 300. For convenience, the process 300 will be described as being performed by an appropriately programmed system of one or more computers.

The system receives an initial machine language instruction (310). The initial machine language instruction is intended to be executed in a first execution mode of a particular processor. As described above, the system can receive the initial machine language instruction from a compiler or from an instruction selector.

The system determines that the initial machine language instruction satisfies one or more risk criteria (320). The risk criteria can be used to identify potentially unsafe instructions in the event of a mode switching attack. In particular, the system can evaluate the initial machine language instruction to determine what operation the instruction performs when executed in a second processor execution mode.

The system can evaluate the initial machine language instruction to determine if it includes branch instructions in the second execution mode. For example, as set forth above with reference to FIG. 2, the system can identify an ARM breakpoint instruction that includes a Thumb branch instruction when in the Thumb execution mode. As another example, the system can identify an unconditional ARM NOP instruction that includes a Thumb "branch-with-link-and-exchange" instruction (blx) that could potentially be used to jump to an arbitrary code location.

The system can also evaluate the initial machine language instruction to determine if it includes an unsafe load or store instruction. Unsafe load and store instructions are instructions that could potentially read from or write to unauthorized storage locations, i.e., ones to which a native code module should not have access.

The system can also evaluate a frequency of the initial machine language instruction. The system can evaluate a number of the most frequently emitted machine language instructions, which are more likely to be encountered by a malicious thread jumping into a given portion of native code. For example, in some implementations, the system can pay particular attention to NOP and breakpoint instructions.

Other types of risk criteria can also be used, depending on the features of the specific ISA implementation.

The system generates one or more alternative machine language instructions (330). The system can generate or alter the initial machine language instruction to an alternative machine language instruction that mitigates the risks of a mode switching attack. Ideally, the system will replace unsafe branch, load, or store instructions in the second execution mode with instructions that halt execution in the second execution mode, e.g. a Thumb breakpoint instruction. The system can also ensure that the one or more alternative machine language instructions are computationally equivalent to the initial machine language instruction. That is, the change to the alternative machine language instruction will be transparent to a user or an application of the executing thread.

The system can include a lookup table that maps potentially problematic instructions for the first execution mode, e.g., ARM instructions, to alternative instructions in the first execution mode that have more preferable characteristics if they happen to be encountered by the processor in the second execution mode, e.g. as Thumb instructions.

The system can, for example, include data enumerating a set of equivalent instructions for a first machine language instruction and select a subset to be stored in the lookup table. For example, enumerating the possibilities for an ARM NOP instruction can result in the following candidate Thumb instructions:

| f000 0320 | and.w | r3, r0, #32 |
| f000 1320 | and.w | r3, r0, #0x200020 |
| f000 9320 | b.w | <main+0xc00674> |

The first two "AND" instructions will generally be preferable to the last branch instruction because the AND instructions are less likely to allow an attacker to execute or jump to arbitrary code. Therefore, the system can select the equivalent ARM instructions that resulted in the first two "AND" instructions and store them in a lookup table to be used in place of the initial ARM NOP instruction.

As another example, for an initial instruction that halts execution, e.g., an ARM breakpoint instruction, the system can select an alternative instruction that, when executed as one or more Thumb instructions in the second execution mode would halt execution. For example, the system can select an alternative instruction that results in a Thumb instruction that is a Thumb breakpoint instruction; an undefined Thumb instruction, which, when executed would trap to the operating system for handling; an instruction that attempts to write to an address in non-writeable memory; an instruction that attempts to read from an address in non-readable memory; an instruction that calls a specially selected function during runtime; or a set of instructions that causes the program to enter an infinite loop. Other instructions that halt execution can also be selected.

The system can emit multiple alternative instructions for a single initial instruction, a single alternative instruction for multiple initial instructions, or multiple alternative instructions for multiple initial instructions. For example, instead of selecting a single "multiply and add" instruction that has a problematic Thumb interpretation, the system could instead select a separate "multiply" instruction followed by a separate "add" instruction. The system can also alter the processor registers of a particular ARM instruction, e.g. selecting R1 instead of R2, to emit an equivalent instruction that may have a safer interpretation if ever executed as a Thumb instruction.

In addition to or instead of choosing different Thumb instructions for the second execution mode, the system can also evaluate and alter the destination addresses of Thumb branch instructions. For example, the system can determine that an instruction when interpreted as a Thumb branch instruction has an unsafe destination address. The system can accordingly select an alternative instruction so that the Thumb branch instruction jumps to a different address. The different address can be a specific address that the system knows to be safe, for example, a known Thumb breakpoint instruction. The system can alter the destination address depending on the current address of the initial instruction to restrict possible branch destinations. The system can also mask off the least-significant bits of Thumb destination addresses, for example, to 16-byte word boundaries, to further restrict the possible locations to which an unintended Thumb branch instruction could jump.

Selecting such alternative machine language instructions to prevent harm from an unintended execution mode can also be used in other contexts besides generating native code modules and besides mitigating mode switching attacks. For example, a compiler or binary translator can use the above techniques when generating machine language instructions generally, which may mitigate other kinds of attacks, e.g. return-oriented programming (ROP) attacks.

The system provides the one or more alternative machine language instructions (340). For example, an instruction selector or compiler could provide the alternative machine language instructions as a native code module for execution by a processor or for further evaluation and validation by a validator, e.g. validator 113.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
   receiving in a computing system having a processor that can operate in a first execution mode and a different second execution mode, a program that has an initial machine language instruction for execution by the processor in the first execution mode, wherein the initial machine language instruction, when executed by the processor in the first execution mode, performs a first operation;
   determining, by an instruction selector of a plugin configured to execute the program on the processor, that a portion of the initial machine language instruction, when the portion is interpreted by the processor as an instruction in the second execution mode, causes the processor to perform a second operation that is different from the first operation and that satisfies one or more risk criteria;
   in response, generating, by the instruction selector of the plugin, one or more alternative machine language instructions to replace the initial machine language instruction for execution by the processor in the first execution mode, wherein the one or more alternative machine language instructions, when interpreted by the processor as instructions in the first execution mode, cause the processor to perform a third operation that is similar to the first operation, and wherein the one or more alternative machine language instructions, when interpreted by the processor as one or more instructions in the different second execution mode, cause the processor to perform a fourth operation that is different from the second operation and that does not satisfy the one or more risk criteria of the second operation being performed by the processor when the portion of the initial machine language instruction is interpreted as an instruction in the second execution mode; and
   replacing, by the instruction selector of the plugin, the initial machine language instruction with the one or more alternative machine language instructions in the program.

2. The method of claim 1, further comprising:
   receiving an intermediate language instruction, wherein generating the one or more alternative machine language instructions comprises selecting the one or more alternative machine language instructions to correspond to the intermediate language instruction.

3. The method of claim 1, wherein determining that the portion of the initial machine language instruction satisfies the one or more risk criteria comprises determining that the portion of the machine language instruction when executed by the processor in the second execution mode comprises a branch instruction.

4. The method of claim 1, wherein determining that the portion of the initial machine language instruction satisfies the one or more risk criteria comprises determining that the portion of the machine language instruction when executed by the processor in the second execution mode comprises an unsafe load or store instruction.

5. The method of claim 1, wherein the initial machine language instruction in the first execution mode is a NOP instruction, and wherein generating the one or more alternative instructions comprises altering the NOP instruction in the first execution mode.

6. The method of claim 1, wherein the initial machine language instruction in the first execution mode is a NOP instruction, and wherein generating the one or more alternative machine language instructions comprises generating a sequence of instructions that are equivalent to a NOP instruction in first execution mode.

7. The method of claim 6, wherein the sequence of instructions comprises one or more AND instructions.

8. The method of claim 1, wherein generating the one or more alternative machine language instructions comprises selecting an instruction that halts execution in the second execution mode.

9. The method of claim 8, wherein selecting an instruction that halts execution in the second execution mode comprises selecting a breakpoint instruction in the second execution mode.

10. The method of claim 8, wherein selecting an instruction that halts execution in the second execution mode comprises selecting an instruction that writes to an address in non-writeable memory, or an instruction that reads from an address in non-readable memory.

11. The method of claim 1, wherein generating the one or more alternative machine language instructions comprises altering a destination address of a branch instruction in the second execution mode.

12. The method of claim 11, wherein altering the destination address of a branch instruction in the second execution mode comprises masking the least-significant bits of the destination address.

13. A system comprising:
one or more computers and one or more storage devices storing instructions that are operable, when executed by the one or more computers, to cause the one or more computers to perform operations comprising:
receiving in a processor in the system, the processor having a first execution mode and a different second execution mode, a program that has an initial machine language instruction for execution by the processor in the first execution mode, wherein the initial machine language instruction, when executed by the processor in the first execution mode, performs a first operation;
determining, by an instruction selector of a plugin configured to execute the program on the processor, that a portion of the initial machine language instruction, when the portion is interpreted by the processor as an instruction in the second execution mode, causes the processor to perform a second operation that is different from the first operation and that satisfies one or more risk criteria;
in response, generating, by the instruction selector of the plugin, one or more alternative machine language instructions to replace the initial machine language instruction for execution by the processor in the first execution mode, wherein the one or more alternative machine language instructions, when interpreted by the processor as instructions in the first execution mode, cause the processor to perform a third operation that is similar to the first operation, and wherein the one or more alternative machine language instructions, when interpreted by the processor as one or more instructions in the different second execution mode, cause the processor to perform a fourth operation that is different from the second operation and that does not satisfy the one or more risk criteria of the second operation being performed by the processor when the portion of the initial machine language instruction is interpreted as an instruction in the second execution mode; and
replacing, by the instruction selector of the plugin, the initial machine language instruction with the one or more alternative machine language instructions in the program.

14. The system of claim 13, wherein the operations further comprise:
receiving an intermediate language instruction, wherein generating the one or more alternative machine language instructions comprises selecting the one or more alternative machine language instructions to correspond to the intermediate language instruction.

15. The system of claim 13, wherein determining that the portion of the initial machine language instruction satisfies the one or more risk criteria comprises determining that the portion of the machine language instruction when executed by the processor in the second execution mode comprises a branch instruction.

16. The system of claim 13, wherein determining that the portion of the initial machine language instruction satisfies the one or more risk criteria comprises determining that the portion of the machine language instruction when executed by the processor in the second execution mode comprises an unsafe load or store instruction.

17. The system of claim 13, wherein generating the one or more alternative machine language instructions comprises selecting an instruction that halts execution in the second execution mode.

18. The system of claim 13, wherein generating the one or more alternative machine language instructions comprises altering a destination address of a branch instruction in the second execution mode.

19. A computer program product, encoded on one or more non-transitory computer storage media, comprising instructions that when executed by one or more computers cause the one or more computers to perform operations comprising:
receiving in a processor having a first execution mode and a different second execution mode, a program that has an initial machine language instruction for execution by the processor in the first execution mode, wherein the initial machine language instruction, when executed by the processor in the first execution mode, performs a first operation;
determining, by an instruction selector of a plugin configured to execute the program on the processor, that a portion of the initial machine language instruction, when the portion is interpreted by the processor as an instruction in the second execution mode, causes the processor to perform a second operation that is different from the first operation and that satisfies one or more risk criteria;
in response, generating, by the instruction selector of the plugin, one or more alternative machine language instructions to replace the initial machine language instruction for execution by the processor in the first execution mode, wherein the one or more alternative machine language instructions, when interpreted by the processor as instructions in the first execution mode, cause the processor to perform a third operation that is similar to the first operation, and wherein the one or more alternative machine language instructions, when interpreted by the processor as one or more instructions in the different second execution mode, cause the processor to perform a fourth operation that is different from the second operation and that does not satisfy the one or more risk criteria of the second operation being performed by the processor when the portion of the initial machine language instruction is interpreted as an instruction in the second execution mode; and
replacing, by the instruction selector of the plugin, the initial machine language instruction with the one or more alternative machine language instructions in the program.

20. The computer program product of claim 19, wherein the operations further comprise:

receiving an intermediate language instruction, wherein generating the one or more alternative machine language instructions comprises selecting the one or more alternative machine language instructions to correspond to the intermediate language instruction.

21. The computer program product of claim 19, wherein determining that the portion of the initial machine language instruction satisfies the one or more risk criteria comprises determining that the portion of the machine language instruction when executed by the processor in the second execution mode comprises a branch instruction.

22. The computer program product of claim 19, wherein determining that the portion of the initial machine language instruction satisfies the one or more risk criteria comprises determining that the portion of the machine language instruction when executed by the processor in the second execution mode comprises an unsafe load or store instruction.

23. The computer program product of claim 19, wherein generating the one or more alternative machine language instructions comprises selecting an instruction that halts execution in the second execution mode.

24. The computer program product of claim 19, wherein generating the one or more alternative machine language instructions comprises altering a destination address of a branch instruction in the second execution mode.

25. The method of claim 1,
wherein receiving the initial machine language instruction for execution by the processor in the first execution mode comprises receiving the initial machine language instruction by an instruction selector of a web browser plugin having a native code module, and further comprising:
providing, by the instruction selector to the native code module, the program having the one or more alternative machine language instructions to be executed natively by the native code module.

26. The system of claim 13,
wherein receiving the initial machine language instruction for execution by the processor in the first execution mode comprises receiving the initial machine language instruction by an instruction selector of a web browser plugin having a native code module, and
wherein the operations further comprise providing, by the instruction selector to the native code module, the program having the one or more alternative machine language instructions to be executed natively by the native code module.

27. The computer program product of claim 19,
wherein receiving the initial machine language instruction for execution by the processor in the first execution mode comprises receiving the initial machine language instruction by an instruction selector of a web browser plugin having a native code module, and
wherein the operations further comprise providing, by the instruction selector to the native code module, the program having the one or more alternative machine language instructions to be executed natively by the native code module.

\* \* \* \* \*